United States Patent [19]

Weyant

[11] 4,325,297
[45] Apr. 20, 1982

[54] APPARATUS FOR BUFF BLANCHING PEANUTS

[75] Inventor: Lowell E. Weyant, Edenton, N.C.

[73] Assignee: Seabrook Blanching Corporation, Edenton, N.C.

[21] Appl. No.: 241,793

[22] Filed: Mar. 9, 1981

Related U.S. Application Data

[63] Continuation of Ser. No. 92,537, Nov. 8, 1979, abandoned, which is a continuation of Ser. No. 937,488, Aug. 28, 1978, abandoned.

[51] Int. Cl.³ .................... A23N 7/00; A23N 12/00
[52] U.S. Cl. ..................... 99/625; 99/575; 99/585; 99/621; 99/629
[58] Field of Search ............. 99/521, 524, 540, 574, 99/575, 585, 609, 618, 621, 624, 625, 629; 198/862, 863

[56] References Cited

U.S. PATENT DOCUMENTS

| | | | |
|---|---|---|---|
| 421,681 | 2/1890 | Dexter | 99/585 |
| 1,157,199 | 10/1915 | Williams | 99/575 |
| 1,558,591 | 10/1925 | Chalmers | 99/524 |
| 2,065,093 | 12/1936 | Rebechini | 99/575 |
| 3,123,115 | 3/1964 | Howard | 99/575 |
| 3,602,280 | 8/1971 | Hill et al. | 99/625 |
| 4,034,665 | 7/1977 | McFarland et al. | 99/625 |

*Primary Examiner*—Philip R. Coe
*Assistant Examiner*—Timothy F. Simone
*Attorney, Agent, or Firm*—Morse, Altman, Oates & Dacey

[57] ABSTRACT

An apparatus is provided for buff blanching peanuts. The machine is adapted to remove the dark outer skin of shelled peanuts and, at the same time, produce a textured finish on the surface of the nuts to enhance the adhesion of an applied coating such as chocolate or the like. The buff blancher includes a pair of driven parallel rollers having abrasive surfaces and mounted in closely spaced parallel relation with one roller being offset above a lower roller. The rollers are mounted in a housing into one end of which peanuts are delivered for movement along and against the two rollers and discharged at the other end of the housing. The housing may be raised at the feed end in order to provide an incline for the flow of nuts and may be tilted about its longitudinal axis to control the degree of buffing action between the peanuts and the rollers. Baffles are provided to guide the nuts with respect to the rollers and various adjustments are provided for setting the apparatus at a proper angle according to the particular nuts being processed.

9 Claims, 8 Drawing Figures

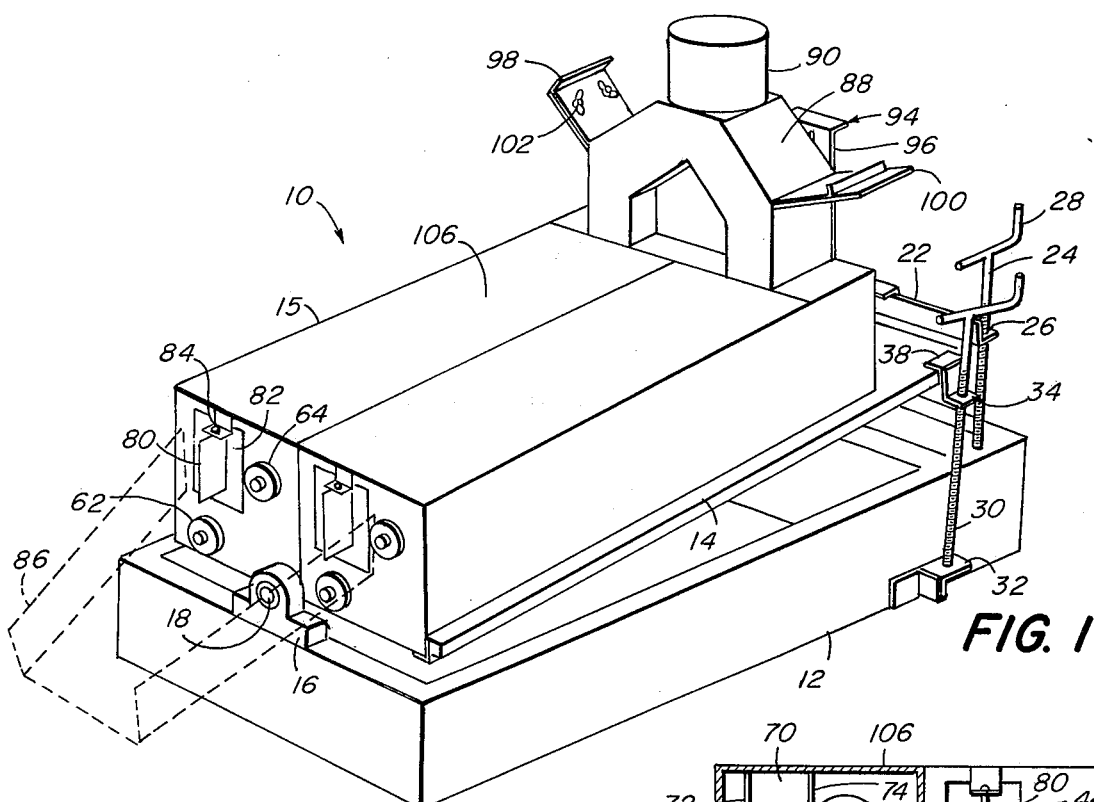
FIG. 1
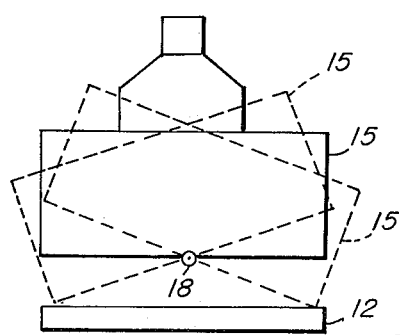
FIG. 2
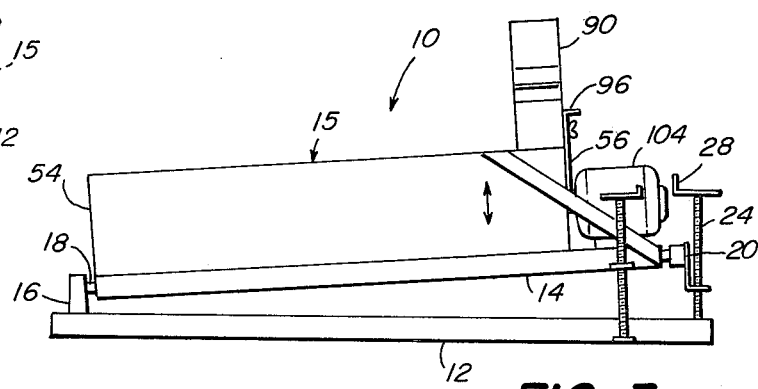
FIG. 3
FIG. 5
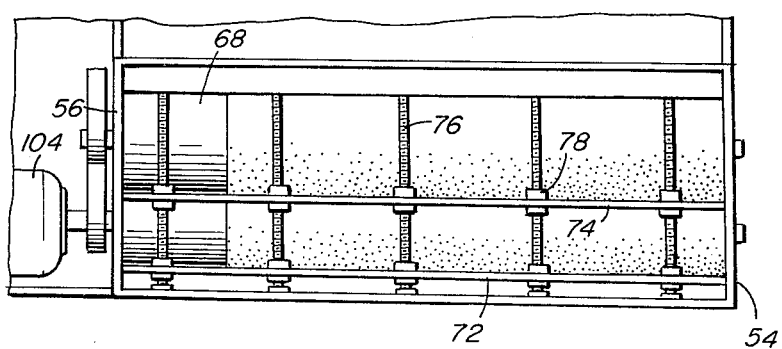
FIG. 4

APPARATUS FOR BUFF BLANCHING PEANUTS

This application is a continuation of application Ser. No. 92,537 filed on Nov. 8, 1979, now abandoned, which is a continuation of application Ser. No. 937,488 filed on Aug. 28, 1978, now abandoned.

BACKGROUND OF THE INVENTION

1. Field of the Invention

This invention relates generally to peanut blanching and buffing equipment and more particularly is directed towards a new and improved apparatus for buff blanching peanuts using a pair of parallel abrasive rolls.

2. Description of the Prior Art

In the processing of peanuts it is customary, at least for many peanut uses, to remove the dark outer skin from the nut after the nut has been shelled. The process of removing the dark skin is known as blanching and it may be done by a number of different procedures and machines already known in the art. For example, blanching may be carried out by a wet process called water blanching by which the nuts are soaked in water to loosen the skins and then passed between a moving belt and an oscillating pad that rubs the skin from the nut. Dry blanching techniques have utilized a horizontally moving belt on which the nuts are deposited. Fixed abrasive baffles are disposed diagonally across and slightly above the belt so that the nuts spin and roll diagonally across the belt along the face of the baffle as the belt moves in a lengthwise direction. The spinning, rolling action against the abrasive face wears off the skin to achieve the blanching action. Various other means have been used to perform the blanching step.

While the foregoing procedures and equipment are useful in blanching nuts where the nuts are to be consumed uncoated or to be converted into peanut butter, the prior art has not been particularly successful in blanching a nut which produces a buffed finish which provided a good surface for adhering various coatings that may be applied to the nuts. For example, peanuts frequently are used as centers for candies with the nuts being coated with various substances such as chocolate, etc. If the blanced nut has too smooth a surface, the coating tends to separate from the nut, whereas if the surface is too rough usually an excessive amount of nut meat has been removed and wasted and the surface itself is irregular. In either event, the blanching equipment currently available has not been able to produce efficiently and at low cost a blanched peanut having a buffed surface ideally suited for coating.

Accordingly, it is an object to the present invention to provide a novel apparatus for buff blanching peanuts to produce a blanched peanut having a textured surface appropriate for coating.

Another object of this invention is to provide a buff blanching machine adapted to be adjusted to accommodate a variety of peanuts having different physical characteristics such as size, shape, skin tightness, and the like.

Another object of this invention is to provide a machine for buff blanching peanuts without appreciable damage to the nuts by way of splitting or excess removal of nut meat.

SUMMARY OF THE INVENTION

This invention features a machine for buff blanching shelled peanuts, comprising a housing, means mounting the housing for tilting the housing about a pair of mutually perpendicular axes to control the flow of nuts through the housing and the buffing and blanching action thereof, a pair of driven rollers mounted in closely spaced, parallel relation within the housing with one roller being offset to the side and slightly above the other roller to form a longitudinal trough or channel along which the nuts are carried. The rollers are covered over most of their surfaces with an abrasive material and are rotated in the same direction with the upper roller moving slightly faster than the lower roller. Nuts fed at the raised end of the housing will pass along the channel and against the rollers and will be buffed and blanched as they move lengthwise through the housing for discharge from the lower opposite end of the housing. The angle of the housing may be raised or lowered to control the speed at which the nuts pass through the apparatus and the housing may be tilted about its longitudinal axis to control the angular attitude of the channel according to the characteristics of the particular nuts being processed.

BRIEF DESCRIPTION OF THE DRAWINGS

FIG. 1 is a view in perspective of a machine made according to the invention for buff blanching peanuts, FIG. 2 is a sectional view in end elevation showing the roller arrangement in the machine.

FIG. 3 is a view in side elevation of the machine,

FIG. 4 is a top plan view thereof with the cover removed,

FIG. 5 is an end view of the apparatus illustrating different angular positions of the housing.

DETAILED DESCRIPTION OF THE PREFERRED EMBODIMENT

Figure 6:
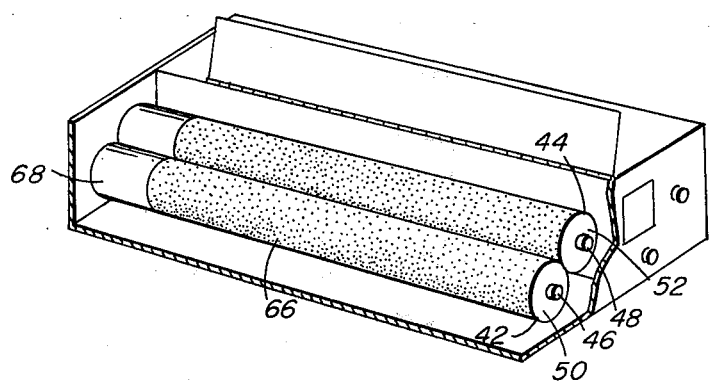
FIG. 6 is a view in perspective, partly broken away, to show details of construction.

Referring now to the drawings and to FIG. 1 in particular, the reference character 10 generally indicates a buff blanching machine for peanuts made according to the invention. The machine is generally organized about a base support 12 on which is mounted an angularly adjustable frame 14 carrying a housing 15 through which the peanuts flow from the right hand end to the left hand end thereof as viewed in FIG. 1. The base 12 typically is a generally rectangular member mounted horizontally on any type of fixed support and may be located in a row with other similar machines for mass production peanut processing. The base 12 is provided at its forward or left hand end with a swivel type bearing 16 to receive the forward end of a shaft 18 extending longitudinally through the housing frame 14 and along the centerline thereof.

The rear or right hand end of the shaft 18 extends to the back of the frame 14 and is rotatably supported by means of a bearing 20 mounted centrally of a transverse bracket 22. The swivel bearing 16 at the front of the apparatus allows the frame 14 and housing 15 to be tilted about two mutually perpendicular axes, one axis being the longitudinal axis extending along the centerline of the shaft 18 while the other axis runs in a horizontal perpendicular plane through the bearing 16 and allows the frame and housing to be raised or lowered at the rear end thereof.

The means for raising and lowering the rear portion of the apparatus in order to control, in part, the flow rate of the nuts through the machine, include vertically mounted lead screws 24 and 26 at the rear of the unit and threadably engaging follower nuts 26 at each side of the bracket 22. The lead screws are rotatably supported at their lower ends by suitable bearings in the base 12. A crank handle 28 is provided at the upper end of each lead screw by means of which the operator may raise or lower the rear portion of the unit, as required.

The tilt angle of the housing about the axis of the shaft 18 is controlled by means of a pair of lead screws 30, one mounted at each side of the apparatus. Each lead screw 30 is rotatably supported at its lower end on a suitable bearing block 32 while the upper portion threadably engages a follower screw 34 mounted to the frame 14 by means of a bracket 38. A crank handle 40 is provided at the upper end of the lead screw. Once the proper rear elevation of the housing is established by the lead screws 24 the tilt angle is set by manipulation of the lead screws 30. Obviously a variety of other mechanisms may be employed to raise and lower the rear portion of the housing as well as to adjust the tilt angle. Cams, rack and pinion gearing, pneumatic and hydraulic cylinders, and the like, may be used to advantage.

The housing 15, in the illustrated embodiment, is generally rectangular and preferably is fabricated from sheet stainless steel or the like. The illustrated machine is provided with two buff blanching channels which, in the size described below, is adapted to process approximately 1000 lbs. per hour of redskin peanuts per channel. The illustrated apparatus includes, in each channel, of two parallel rollers, a lower roller 42 and an upper roller 44, typically 6" in diameter and 36" in length. These dimensions may be varied in order to increase or decrease the capacity of the apparatus.

Figure 7:
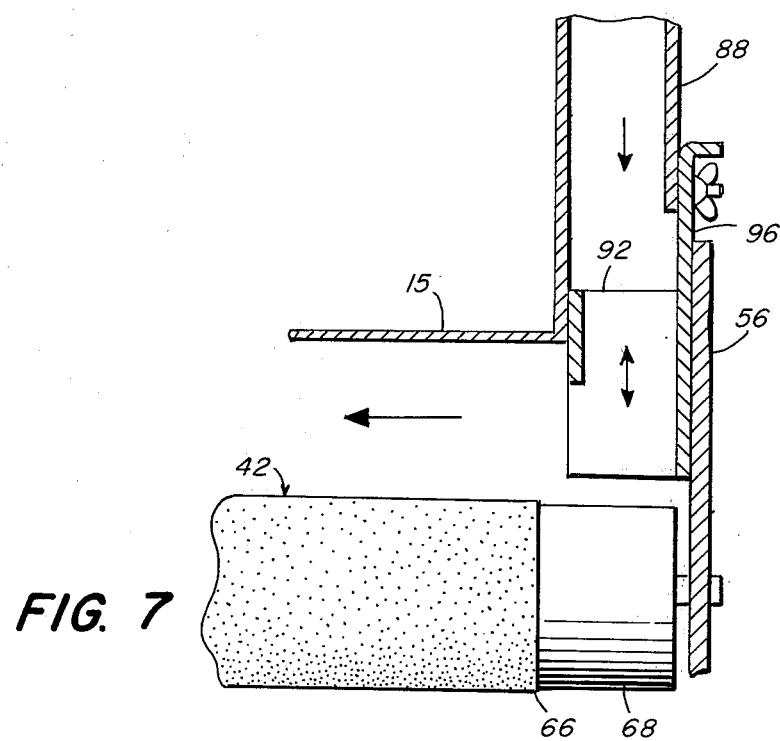
FIG. 7 is a detail sectional view of the nut feed portion of the apparatus.
Figure 8:
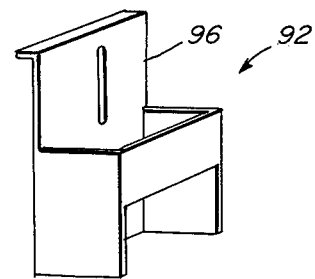
FIG. 8 is a perspective view of the adjustable spout.

Insofar as each channel is substantially identical, only one will be described in detail. The rollers 42 and 44 preferably are hollow and fabricated from cylindrical metal tubing of stainless steel or the like mounted each to a central axle 46, 48 by means of end caps 50, 52. The axles for each of the rollers 42, 44 are mounted in bearings supported by housing end walls 54 and 56. Each of the end walls, as shown in FIG. 7, is provided with slot openings 58 and 60 in which the axle bearings 62 and 64 for the rollers are mounted. The slot 58 for the lower roller 42 is oriented perpendicularly while the slot 60 for the upper roller 44 is disposed above and to the side of the slot 48 and oriented at a 45° angle thereto.

As best shown in FIG. 2, the rollers are mounted in closely spaced, parallel, offset relation to one another with a slight gap formed therebetween. The upper roller 44 is to the side and partially above the lower roller 42 and, in practice, the upper roller should be approximately at a 45° angle with respect to the lower roller. The slot openings 58 and 60 allow for adjusting the position of the rollers with respect to one another. Assuming a pair of 6" diameter rollers, the slots 58 and 60 would be approximately 6" apart. The adjusting capability for the rollers is provided first to assure a proper gap setting between the two rollers and then to correct that gap as the diameter of the rollers change due to wear and sebsequent rebuilding. Both rollers are covered with an abrasive grit 66 covering most of their outer surfaces. However, the left hand ends as shown in FIG. 6, which is the feed end of the apparatus, are uncoated leaving the end portions 68 bare of any abrasive material for reasons that will presently appear. The length of the uncoated portions 68 preferably is 4" with the result that the coating 66 produces an increase in the outside diameter of the remaining portion of the rolls. The abrasive coating is built up typically of perhaps 3 or 4 successive layers of a suitable bonding agent such as urethane, for example, and a suitable abrasive grit, such as aluminum oxide, applied by dusting thereon. A grit size on the order of 46 to 60 has been found to give satisfactory performance. In time, the original abrasive grit coating will wear down, thus reducing the outside diameter of the rollers and requiring a re-adjusting of the positions of the rollers in order to maintain a proper gap between the two rollers. When the abrasive coating has worn to the point that the desired buffing and blanching action is not produced, the rollers are removed and recoated to build up the desired abrasive coating. Insofar as this will increase the outside diameter of the rollers their positions must be reset to maintain the proper roller gap.

The two rollers 42 and 44 in the offset arrangement shown in FIG. 2 form a somewhat V shaped trough or channel 70 bounded by the two rollers as well as by a pair of vertical baffles 72 and 74 along which channel peanuts 75 flow. The baffles 72 and 74 depend from horizontal struts 76 and extend from the top of the unit and down to a point almost touching the rollers. The longer outside baffle 72 terminates at its lower end near the outside of the lower roller 42 while the shorter baffle 74 terminates near the inside of the upper roll 44.

Within the channel 70 defined by the two rollers and the baffles, the peanuts move and undergo buffing and blanching action caused by rotation of the rollers 42 and 44, both rollers turning in the same direction but at different speeds. In practice, the lower roller rotates at approximately 450 rpm while the upper roller 44 rotates at approximately 550 rpm. This action causes the nuts, which substantially fill the channel 70, to flow in a counter clockwise pattern so that all of the nuts within the channel will work their way into contact with the abrasive rollers and then move out of contact so that the general path followed by any given nut within the channel will be more or less helical as it flows along the channel. Insofar as the housing itself is tilted downwardly the flow of nuts will be forwardly from the feed end to the discharge end.

The baffles 72 and 74 may be moved to an away from the rollers 42 and 44 by means of positioning nuts 78 threaded to the struts 76 which support the baffles. In order to keep the lower edges of the baffles 72 and 74 in close proximity with the surfaces of the rollers, the baffles may be moved back and forth along the struts for periodic adjustments to compensate for wear or rebuilding of the coated roller surface.

The rate at which the nuts flow through the blancher is controlled not only by the angular elevation of the housing, but also by a vane 80 mounted centrally in a discharge opening 82 formed in the end wall 54 and through which the nuts pass after flowing through the channel. The vane 80 is vertically mounted and may be pivoted about its vertical axis to a fully open position in which the plane of the vane is parallel to the axes of the rollers and which allows a maximum opening for the substantially unrestricted flow of nuts through the apparatus. The vane may also be turned to various degrees of closure by which the opening will be reduced. This is done by manipulating a lock nut 84 engaging the upper end of the vane hinge. Thus, by controlling the angular position of the vane, the flow of nuts through the machine may be controlled. From the opening 82 the nuts are discharged onto a chute 86 for delivery to a moving belt, hopper or the like.

The nuts are fed into the blancher at the feed end through a manifold 88 in the form of an inverted Y, each connecting to a blanching channel, while a center neck portion 90 is connected to a supply of unblanched peanuts. The nuts flow down the neck 90, separating into two paths and feed down into the two separate channels at points directly above the uncoated portions 68 of the two rollers of each channel. It has been found that if the rollers are fully coated from end to end, the nuts on entering the blancher undergo severe bouncing resulting in an unacceptably high percentage of split peanuts. By providing an uncoated section of the rollers directly at the feed end of the apparatus, the bouncing of the entering nuts is substantially eliminated and the nuts feed smoothly and steadily into and through the machine.

The manifold includes two telescopic feed spouts 92 and 94 which may be raised or lowered in order to control the rate of feed of the nuts into the apparatus, the spouts may be locked into position by means of set screws connected to the manifold spout and engaging a vertically slotted flange 96 on each spout to allow the spouts to be set at any given height.

Also controlling the flow of the nuts and allowing complete shut-off of the nut flow to either or both channels, are gates 98 mounted on slides 100, one extending outwardly from each leg of the manifold. Each gate is adapted to move in and out of a slot formed in the wall of each manifold leg and may extend fully across the spout if it is desired to terminate completely the flow of nuts, or the gate may be locked in any position from fully closed to fully open by means of locking nuts 102.

The rollers are driven by means of a motor 104 mounted to the rear of the machine on the frame 14. The motor is drivingly connected to the rollers through a belt and pulley system which allows one motor to drive all four rollers in a two channel buffer with the upper rollers moving faster than the lower rollers.

By making various adjustments to the machine very precise control can be achieved over the buffing and blanching action for any particular type of peanuts being processed. The degree of blanching and buffing is controlled primarily by adjusting the discharge vane 80. By partially closing the vane, the nuts are held within the channel for a greater length of time than with the vane fully open, producing greater blanching and buffing action thereon. The elevation of the rear portion of the machine also effects the rate at which the nuts flow through the machine and by raising or lowering the rear of the machine, the forward flow may be increased or decreased with a corresponding increase or decrease in the exposure time of the peanuts to the blanching rollers. The flow of nuts into the machine is controlled by the position of the spouts as well as by the gates previously described. For hard to blanch peanuts the degree of incline is reduced, while for those peanuts that are easy to blanch the degree of incline is increased.

The angular tilt of the blancher about the axle 18 controls the amount of bite that the blancher rollers have on the peanuts. By tilting the machine to the left, as viewed in FIG. 2, for example, the bite is decreased while tilting it to the right will increase the bite.

The housing is provided with a hinged cover 106 which allows for inspection, cleaning and repair of the unit head.

While the invention has been described with particular reference to the illustrated embodiment, numerous modifications thereto will appear to those skilled in the art.

Having thus described the invention, what I claim and desire to obtain by Letters Patents of the United States is:

1. Apparatus for buff blanching shelled peanuts and the like, comprising
    (a) an elongated housing having a feed end and a discharge end,
    (b) a pair of rollers rotatably mounted in closely spaced, coextensive, parallel relation longitudinally within said housing between said ends, the gap between said rollers being less than the average size of shelled peanuts passing through said apparatus,
    (c) the end of each of said rollers at the feed end of said apparatus defining smooth cylindrical outer surfaces the remaining portion of said rollers being covered with an abrasive grit stratum,
    (d) power means connected to said rollers for rotating said rollers in the same rotary direction,
    (e) means mounting said housing for angular adjustment thereof about at least two mutually perpendicular axes whereby the buff blanching action of peanuts flowing through said housing may be selectively controlled, one of said axes extending parallel to the axes of said rolls and the other axis being generally horizontal and intersecting said one axis, and,
    (f) at least one longitudinal baffle mounted in a generally vertical plane to said housing in operative parallel relation to each of said rollers and generally tangential thereto and extending substantially the full length thereof to define a longitudinal channel parallel to said rollers for directing a flow of peanuts through said housing from one end of said rollers to the other,
    (g) said rollers being mounted in offset relation to one another with the axis of one roller mounted to the side and above the axis of the other roller, the direction of rotation of said rollers being such that the top portion of the other and lowermost roller is towards the bottom portion of the one and uppermost roller,
    (h) the lower edge of one of said baffles being disposed proximate to the other tangential portion of said other lowermost roller and the lower edge of the other of said baffles being disposed proximate to the inner tangential portion of said one uppermost roller, and
    (i) guide means for directing peanuts fed into said feed end of said apparatus onto the top portion and smooth end of said other lowermost roller for flow along said channel.

2. Apparatus according to claim 1 wherein said one roller is rotated faster than said other roller.

3. Apparatus according to claim 1 wherein each of said baffles is adjustably mounted for movement to and away from said rollers.

4. Apparatus according to claim 1 including feed control means mounted at the feed end of said housing for controlling the flow of peanuts into said housing.

5. Apparatus according to claim 4 wherein said control means includes an adjustable spout movable to and away from said rollers and connected to a conduit for feed peanuts into said housing.

6. Apparatus according to claim 1 wherein the grit of said abrasive grit stratum is of a particle size in the range of 46 to 60.

7. Apparatus according to claim 1 including adjustment means supporting said rolles for relative movement thereof.

8. Apparatus according to claim 1 including flow control means mounted at the discharge end of said housing for controlling the flow of peanuts out of said housing.

9. Apparatus according to claim 8 wherein said flow control means is an adjustable vane mounted across an opening at the discharge end of said housing.

* * * * *